UNITED STATES PATENT OFFICE.

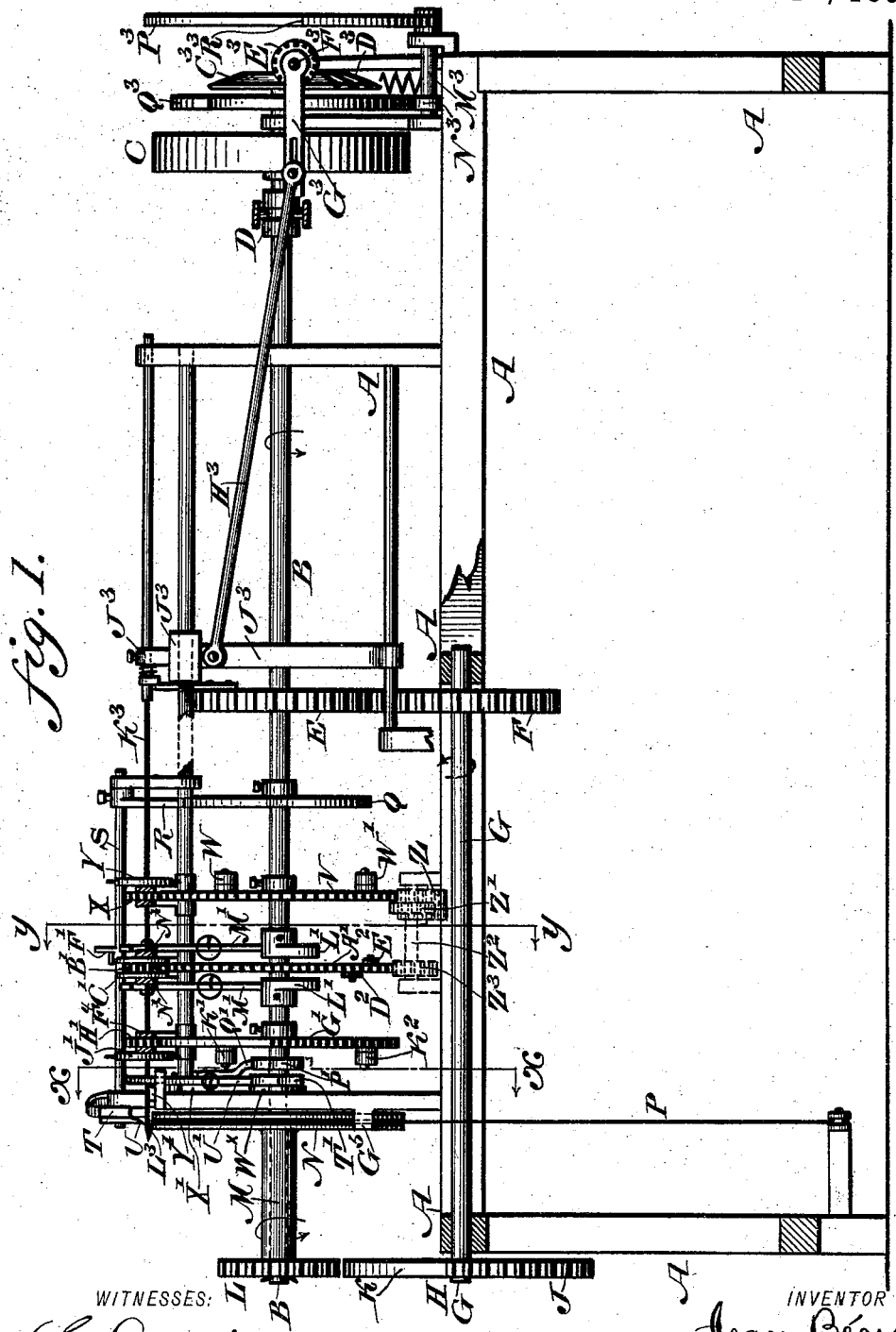

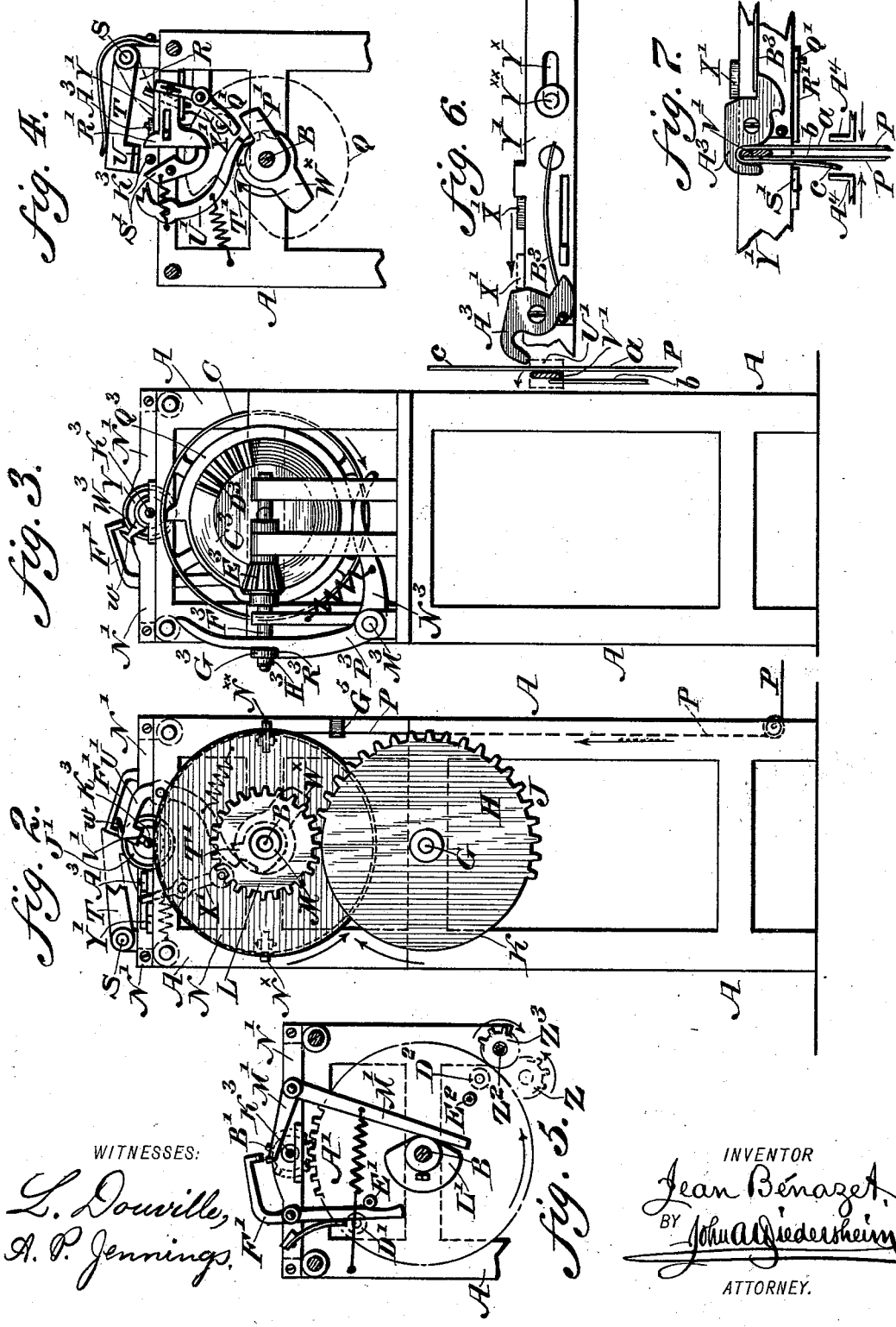

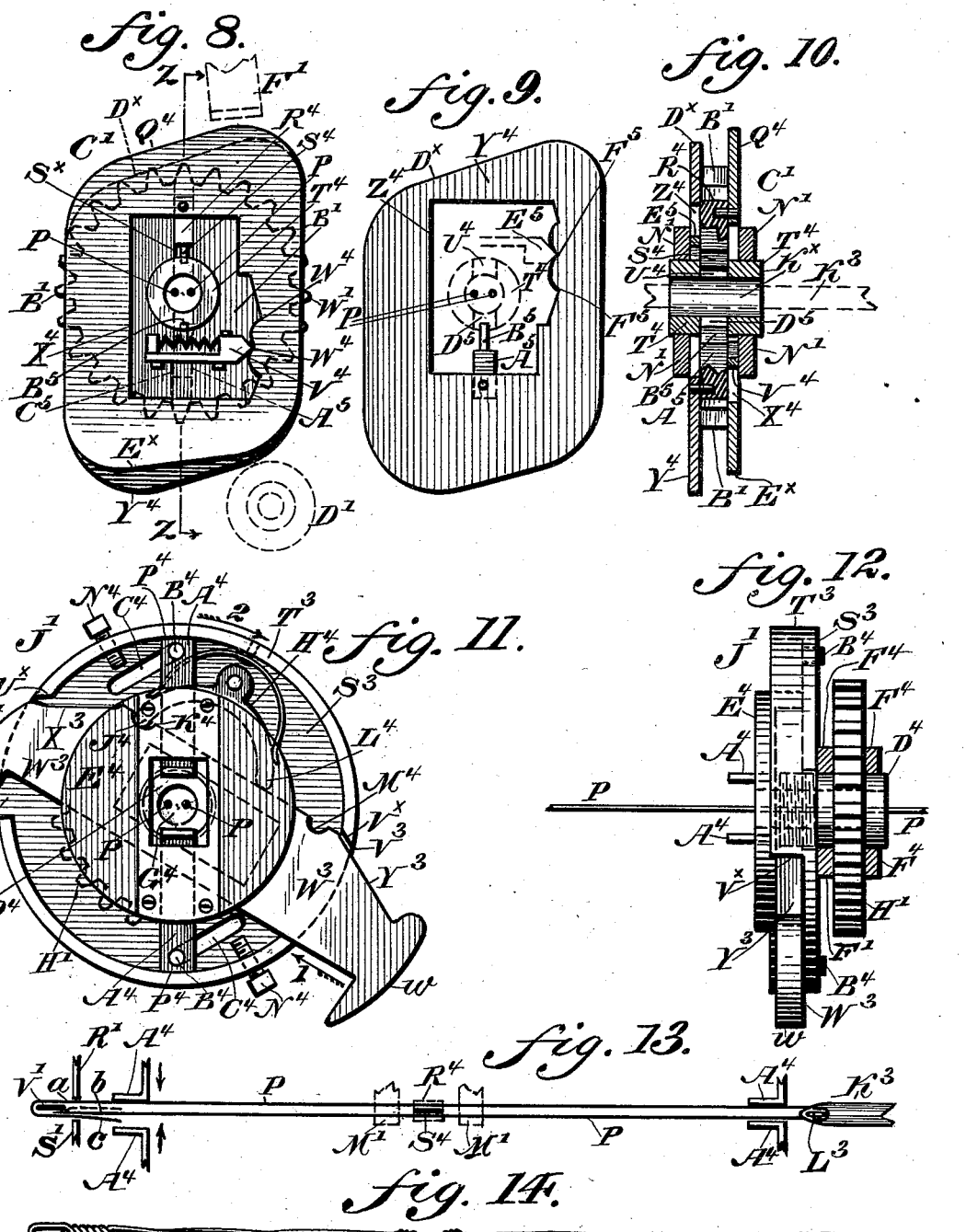

JEAN BÉNAZET, OF RHEIMS, FRANCE, ASSIGNOR TO BÉNAZET HEDDLE CO., LIMITED.

HEDDLE-MAKING MACHINE.

SPECIFICATION forming part of Letters Patent No. 533,858, dated February 12, 1895.

Application filed March 19, 1894. Serial No. 504,201. (No model.)

*To all whom it may concern:*

Be it known that I, JEAN BÉNAZET, a citizen of France, residing at Rheims, in the Department of de la Marne, France, have invented a new and useful Improvement in Machines for Making Wire Heddles, which improvement is fully set forth in the following specification and accompanying drawings.

My invention consists of a machine for making wire heddles, the same embodying means for forming the end-loops and the central eye, and the proper twists aside of the same, said means being hereinafter described, and the novel features pointed out in the claims that follow the specification.

Figure 1 represents a side elevation, partly broken away, of a heddle machine embodying my invention. Figs. 2 and 3 represent elevations of opposite ends of the machine. Fig. 4 represents an end view of a portion of the machine, partly sectional, on line $x, x$, Fig. 1. Fig. 5 represents an end view of a portion of the machine, partly sectional, on line $y, y$, Fig. 1. Fig. 6 represents a plan view of a detached portion on an enlarged scale. Fig. 7 represents a plan view of a portion of the parts shown in Fig. 6, the same being in different positions from those shown in the former figure. Fig. 8 represents a side elevation of the twisting device. Fig. 9 represents a side elevation of one of the slats of the twisting device shown in Fig. 8. Fig. 10 represents a vertical section on line $z, z$, Fig. 8. Fig. 11 represents a front elevation of the twisting device. Fig. 12 represents an end view of the parts shown in Fig. 11. Fig. 13 represents a plan view of the wire as bent previous to being twisted. Fig. 14 represents a view of the product.

Similar letters of reference indicate corresponding parts in the several figures.

Referring to the drawings: A designates the frame of the machine on which is journaled the driving shaft B, provided with a driving pulley C, and a clutch D. The driving shaft B has keyed or otherwise secured to it, a spur wheel E, which meshes with a gear wheel F on a counter shaft G journaled on the frame A. The counter shaft G carries a mutilated spur wheel H, whose periphery has teeth J, and untoothed part K, so as to impart an intermittent rotary motion to a gear wheel L, which latter is secured to the elongated hub M of a grooved feed pulley N, around which latter passes the wire P, from which the heddles are formed, said hub being loosely mounted on said shaft B.

The wire P may be drawn by the pulley N from a reel or any source of supply. It is evident that as the pulley N is secured to the gear wheel L, the intermittent motions imparted to said gear wheel will be transmitted to said pulley N.

Q designates a cam which is secured to the shaft B, and operates a lever R, secured to a rock shaft S, journaled in the frame A. See Figs. 1 and 4. The rock shaft S carries a lever T, formed with a cutting edge U, adapted to sever a projecting end of the wire P, as will be hereinafter described.

V designates a spur wheel, which is secured to the shaft B, and carries the studs or rollers W and W', and meshes with a pinion X journaled in the frame A. Connected with said pinion is a twisting device Y, for the wire from which the heddles are formed, and which device will be hereinafter fully described.

The spur wheel V meshes with a pinion Z, which latter meshes with an idler Z', secured to a shaft $Z^2$, which carries a pinion $Z^3$, the latter meshing with and imparting motion to, a gear wheel A', loosely mounted on the shaft B, it being noticed that the gear wheel A' revolves in an opposite direction to that of the gear wheel V, so that the pinion B' with which the wheel A' meshes, causes the twisting device C' to rotate in the same direction as said pinion B', or in a reverse direction to the twisting device Y.

The gear wheel A' is provided on one of its faces with rollers D' and $D^2$ adapted to operate a portion of the twisting device C'. The opposite face of the gear wheel A' is provided with rollers E' and $E^2$, adapted to impart rocking motions to an elbow lever F', which operates a portion of the twisting device C', notably the plate $Q^4$, which will be hereinafter again referred to.

G' designates a mutilated gear wheel secured to the shaft B, and rotating in the same direction as the wheel V. The object of said wheel G' is to impart an intermittent rotary motion to the pinion H', with which it meshes, so that said pinion may transmit a similar intermittent motion to the twisting device J', with which said pinion is connected.

The wheel G' is provided with rollers K' and K² to operate certain portions of the twisting device J', as will be hereinafter described.

L' designates cams which are secured to the shaft B, and operate the spring-actuated elbow levers M', adapted to bear against a portion of the wire from which the heddles are formed, and hold the same firmly against the cross bars N' of the frame A, while the wire is being twisted in order to form the eye thereof.

P' (Figs. 1 and 4) designates a cam secured to the shaft B, and adapted to operate a lever Q', having one of its ends bearing against a sliding jaw R' which in turn bears against the heel of a pivoted jaw S', so as to operate the same, it being noticed that said jaws constitute a clamping device for firmly holding certain portions of the wire from which the heddle is formed.

T' designates a cam secured to the shaft B so as to operate a spring-actuated elbow lever U', formed with a depending finger V', around which latter is bent a portion of the wire in order to form one of the end loops of a heddle. See Figs. 2, 6, 7 and 13.

W^× designates a cam secured to the shaft B, and adapted to operate a lever X', so that the latter may impart a reciprocating motion to a sliding plate Y', which carries a pivoted finger A³, which is held in its normal position by a spring B³.

C³ designates a head secured to the shaft B, and provided with a beveled toothed segment D³, serving as a multilated pinion. The teeth of said segment D³ mesh with a beveled pinion E³ secured to a shaft F³, so as to impart an intermittent rotary motion to said shaft, the latter carrying with it the arm G³, which is secured thereon, said arm G³ being connected by a pitman H³ with a cross head J³, the latter being guided on the frame A, and receiving reciprocating motion from said pitman, it having the rod K³ secured to it, the same following the motions of said head. The forward end of the rod K³ is formed with a hook L³ adapted to take hold of the wire P, and draw the same from the feed pulley N, and through the several twisting devices hereinbefore described.

M³ (Figs. 1 and 3) designates a rock shaft journaled in the frame A, and carrying a spring-actuated arm N³, and a locking arm P³. The arm N³ is operated by a cam Q³ on the shaft B, and thereby imparts a rocking motion to the shaft M³, which in turn operates the locking arm P³, so that the same may hold, as well as release the arm G³ when so required, said arm P³ being formed with a shoulder R³ to receive the arm G³ and lock the latter while the wire P is being twisted.

The twisting device J', see more particularly Fig. 11, consists of a head S³ formed with a circumferential flange T³, provided with the openings U³ and V³. Guided in said head is a slide or plate W³ formed with cam faces X³ and Y³. As will be seen, the face X³ enters the opening U³, and the face Y³ enters the opening V³, so as to cause the head S³ to rotate to the right and left as required in order to operate the sliding jaws A⁴, which are guided in the head S³, and have their inner ends adapted to hold a portion of the wire while the same is being twisted. The jaws A⁴ are provided with studs B⁴ which enter oblique slots C⁴ in the head S³, so that the motions imparted to the head S³ by the cam faces X³ and Y³ will cause the jaws A⁴ to either open or close as the case may be.

The hub D⁴ of the pinion H', Figs. 11 and 12, has firmly secured to it the central plate E⁴ of the twisting device J', so as to cause said device to rotate with the pinion H'. In said plate E⁴ is guided the slide W³. The head S³ is fitted loosely on the hub D⁴ so as to have a motion independent of that of said hub, for a purpose to be hereinafter described. The hub D⁴ is journaled in a cross bar F⁴ of the frame A, thus leaving the bore G⁴ of said hub free for the passage therethrough of the rod K³ and wire P, caught by said rod.

H⁴ (Fig. 11) designates a spring-actuated tumbler which is pivoted to the head S³, and adapted to have one of its ends J⁴ enter a depression K⁴ in the slide W³, and thereby retain said plate in the proper position. The opposite end L⁴ of the tumbler H⁴ enters at a given time another depression M⁴ in the slide W³, and retains said slide in the proper position for a purpose hereinafter described.

N⁴ designates screws against which abut the outer ends of the jaws A⁴, when the same are closed, so that said jaws may firmly grasp the wire P, while the same is being twisted.

The twisting device Y is similar in construction to the device J'.

The twisting device C' consists of a plate Q⁴ to which is secured a block R⁴ formed with a finger S⁴, said block being guided in a radial slot S^×, in the pinion B', so as to be permitted to slide in said slot, whereby the finger S⁴ may be brought between the wires P, as shown in Fig. 13, and removed therefrom when required.

The hub T⁴ of the pinion B' is journaled in the cross bar N' of the frame A, and formed with an opening U⁴ through which the block R⁴ passes in order that its finger S⁴ may reach the wire P. See Fig. 10.

The pinion B' is provided with a spring bolt V⁴ which engages with recesses W⁴ in the plate Q⁴, so as to retain said plate in its proper position, when the same is raised and lowered. It will be noticed that the plate Q⁴ is formed with an opening X⁴, and that the bolt V⁴ moves within said opening and is flush with the outer face of the plate Q⁴, so that said bolt is held in position on the pinion B' by being in contact with the inner face of the wall of the cross bar N'. See Fig. 10. The twisting device C' consists also of a plate $Y^4$ formed with an opening $Z^4$ similar in shape to the opening $X^4$, but in an inverted position. The plate $Y^4$ has secured to it a block $A^5$, formed with a finger $B^5$, and is guided in a radial slot $D^5$ in the hub $T^4$ of the pinion B', so that said block may travel in the slot $C^5$ in order that the finger $B^5$ after passing through said slot $D^5$ in the hub $T^4$ may enter the space between the wires P and abut against the finger $S^4$ preparatory to twisting the wire, so as to form the eye of the heddle. $E^5$ designates a spring bolt adapted to slide on the pinion B', and engage with either of the recesses or depressions $F^5$ in the plate $Y^4$, so as to hold said plate in its raised or lowered position, as the case may require. The rod $K^3$ moves freely through the bore $K^\times$ of the hub $T^4$, as will be seen in Fig. 10.

The feed pulley N is provided with an automatic clamping or nipping device $N^\times$, which may be of any suitable description, and is adapted to hold the wire P while the pulley draws the same from a reel or other source of supply. The pulley N is also provided with automatic shears $N^{\times\times}$ which may be of any suitable description, and are adapted to cut the wire so that the same may be removed from the pulley N, by the rod $K^3$ and formed into heddles.

$G^5$ designates a clamping device of any suitable construction, to permit the wire P to pass freely through the same in one direction, so that the wire may be drawn through said device by the feed pulley N, but be prevented from yielding due to back action, caused by the tension of the wire from a reel or source of supply.

The operation is as follows: The end of the wire P, which may be supplied from a reel, is passed through the clamping device $G^5$, and inserted by hand between the jaws of the clamping device $N^\times$. The machine is then started, and the feed pulley N in rotating carries the wire P with it until the approximate length required to form a heddle has been drawn from the reel. The pulley N then ceases to rotate, due to the fact that the blank portion K of the gear wheel H has reached the gear wheel L, and passes around the same without coming in contact therewith. The wire is then cut by the shears $N^{\times\times}$. The rod $K^3$ then advances by the mechanism hereinbefore described, and its hook $L^3$ takes hold of the wire P in its path, and the return motion of the rod removes the wire from the feed pulley N, and draws it doubled or with legs of unequal length, through the several twisting devices hereinbefore described, it being noticed that the wire from the reel projects above the clamp $G^5$, so as to be grasped by the clamp $N^\times$ when the latter arrives at the projecting portion. The arm $G^3$ now rests on the shoulder $R^3$ of the arm $P^3$ and is held by the same in a locked position, as shown in Fig. 3. When the wire P has been removed from the feed pulley N, one of its ends projects beyond the other, as clearly shown in Fig. 6. As the longest leg is somewhat longer than required, the proper amount is removed by the cutter U of the lever T, under which the leg has passed. The lever U' is then partly lowered so as to bring its finger V' between the ends of the wire P. See Fig. 6. The lever X' is then operated, and coming in contact with the pivoted finger $A^3$, causes the advance of the same, and of the sliding plate Y'. The spring $B^3$ is sufficiently strong to hold the finger $A^3$ in its normal position on the plate Y', while said plate is being advanced by the lever X'. The end of a slot $Y^\times$ of said plate Y' then abuts against the stud $Y^{\times\times}$ on the frame A, as a stop for the plate. The lever X' has moved only a portion of its throw when the plate Y' has traveled its full extent, so that the lever X' in completing its throw will overcome the holding action of the spring $B^3$, and cause the finger $A^3$ to rotate over and bend the projecting end of the wire P around the finger V', as shown in Fig. 7. The sliding plate Y' is then returned to its former position by the lever X', as shown in Fig. 6, and the pivoted lever $A^3$ is restored to its normal position by the spring $B^3$. The elbow lever U' which remained stationary during this time due to a dwell in the cam T', now completes its downward movement and bears against the wire P, bent around the finger V', thus holding the wire firmly on the frame A. The jaws R' and S' are now closed, as hereinbefore described, and bring the portions $a$ $b$, and $c$ of the wire P close together. See Figs. 7 and 13. The roller $K^2$ now comes in contact with the end $w$ of the slide $W^3$, and causes the same to move in the direction indicated by the arrow 1, in Fig. 11. This causes the cam face $X^3$ to work against the wall $U^\times$ of the opening $U^3$, and rotate the head $S^3$ on the central portion $E^4$ in the direction indicated by the arrow 2, Fig. 11. The slots $C^4$ in connection with the studs $B^4$, will owing to their oblique directions, cause said studs, and consequently the jaws $A^4$ to advance toward each other and firmly grasp the contiguous part of the wire P between them. The roller W' operates a slide in the twisting device Y, in precisely the same manner as described in connection with the twisting device J', while the looped end of the wire is held on the hook $L^3$. The levers M' now bear against the wire P, and firmly hold the same against the frame A. The lever F' in lowering, strikes the plate $Q^4$, and causes the same to slide on the pinion B', so as to bring the finger $S^4$ between the wires P, as shown in Fig. 13. The roller D' at the same time comes in contact with the plate $Y^4$, and causes the same to slide on the pinion B', so as to introduce the finger $B^5$ between the legs of the wires, and to abut against the finger $S^4$. The clamping of the wire by the twisting devices C', J' and Y takes place simultaneously. The moment the devices C', J', and Y take hold of the wires P, they twist the same, owing to their rotary motions, the twists being next to the respective loops and the eye of the heddle, it being seen that the end loops of the heddle are formed by the twisting devices Y and J', and that the central eye is formed by the twisting device C', which latter, as hereinbefore stated, revolves in a reverse direction to the devices Y and J', the central eye being prevented from being closed owing to the fingers $S^4$ and $B^5$, while the adjacent parts of the wire are held by the levers M', said fingers then revolving with their connected parts, and thus producing the twists on opposite sides of said eye. When the wire has received the required number of twists, the devices C', J' and Y let go simultaneously of the same. As the end $w$ of the slide $W^3$ has been moved by the roller $K^2$ in the direction indicated by the arrow 1, Fig. 11, and its opposite end $w'$ advanced and occupied a position some distance from the periphery of the head $S^3$, the roller K' contacted with said end $w'$ (which is the case when the wire P has received the required number of twists) and the slide $W^3$ is moved in a direction opposite to that indicated by the arrow 1, and causes the cam face $Y^3$ of said plate to work against the wall $V^\times$ of the opening $V^3$ so that the head $S^3$ rotates on the central portion $E^4$ in a direction opposite to that indicated by the arrow 2, and thus the slot $C^4$ in connection with the studs $B^4$ will cause the jaws $A^4$ to move away from each other, and thus let go of the wire. As the roller W performs the same function in connection with the twisting device Y, that the roller K' performs in connection with the twisting device J', the description of the operation of one of these twisting devices, will, it is thought, be sufficient for the others. The roller $E^2$ comes in contact with the edge $E^\times$ of the plate $Q^4$, and the roller $D^2$ comes in contact with the edge $D^\times$ of the plate $Y^4$, when the device C' has imparted the required number of twists to the heddle, so that said plates $Q^4$ and $Y^4$ are moved in opposite directions from each other by said rollers, thus causing the fingers $S^4$ and $B^5$ to separate, and withdraw from the eye of the heddle. The several levers U', &c., that hold the wire P while the same is being twisted, let go of said wire at or about the same time that the twisting devices do the same.

When a heddle is finished, the same is pushed back through the twisting devices, and when the motion of the same is to full extent, it drops from the hook $L^3$ of the rod $K^3$, said hook then being located for a fresh operation. The arm $P^3$ which held the arm $G^3$, while the twisting of the wire was being accomplished, is now operated by the rock shaft $M^3$, and caused to move outwardly, so that its shoulder $R^3$ leaves the arms $G^3$, and thus permits the latter to be rotated by the shaft $F^3$ so that the same may take hold of a fresh piece of wire for the formation of another heddle.

As it is essential that the jaws $A^4$, shown in Fig. 7, and the end on the left hand portion of Fig. 13, should take hold of the wire P when said jaws are in the positions shown in said figures, the twisting device J' after imparting the required number of twists to a heddle, ceases to rotate, due to the fact that the blank portion of the gear wheel G' has reached the pinion H', and imparts no motion to the same, whereby the jaws $A^4$ of said device are in the positions shown in order to bring the portion $c$ of the wire P against the parts $a$ and $b$ when the jaws $A^4$ take hold of the same to close the loop, especially at the cut-end of the same.

Having thus described my invention, what I claim as new, and desire to secure by Letters Patent, is—

1. In a wire heddle machine, a frame with a shaft mounted thereon, a wire feed pulley loosely mounted on said shaft, mechanism connected with said shaft for imparting an intermittent rotary motion to said pulley, a sliding rod with hook adapted to draw wire from said pulley, and a series of twisting devices for said wire operated by mechanism connected with said shaft, said parts being combined substantially as described.

2. In a wire heddle machine, a frame with a shaft mounted thereon, a wire feed pulley loosely mounted on said shaft, mechanism connected with said shaft and pulley for imparting an intermittent rotary motion to said pulley, a rod with a hook adapted to draw the wire from said pulley, and mechanism connected with said shaft and rod for imparting an intermittent reciprocating motion to said rod, said parts being combined substantially as described.

3. In a wire heddle machine, a wire feed pulley, mechanism for imparting an intermittent rotary motion to said pulley, a rod with a hook adapted to draw the wire from said feed pulley, and a rock shaft having a lever arm attached thereto provided with a cutting edge, said parts being combined substantially as described.

4. In a wire heddle machine, a frame with a shaft mounted thereon, a wire feed pulley loosely mounted on said shaft, mechanism connected with said shaft and pully for imparting an intermittent rotary motion to the latter, a clamping device for said wire, and a shearing device, said parts being combined substantially as described.

5. In a wire heddle machine, the cams L and the holding elbow levers M', in combination with the cross bars N' of the frame and a wire-twisting device, substantially as described.

6. In a wire heddle machine, the cam P', the lever Q' operated by the same, the sliding jaw R' with which said lever engages, and the pivotal jaw S' against which said jaw R' is adapted to bear, said jaws constituting a clamp for the wire, said parts being combined substantially as described.

7. In a wire heddle machine, a frame, a driving shaft mounted thereon, a wire feed pulley loosely mounted on said shaft, a clamping device for said wire, a shearing device, a reciprocating rod with a hook for drawing said wire from said pulley, a rocking lever with a cutting end, a sliding plate with a pivoted finger thereon, and mechanism for operating said plate and finger, said parts being combined substantially as described.

8. In a wire heddle machine, a frame, a driving shaft thereon, a wire feed pulley loosely mounted on said shaft, a shearing device for said wire, a rod with a hook for drawing said wire from said pulley, mechanism connected with said shaft for imparting reciprocating motions to said rod, the sliding plate Y' with the pivoted finger $A^3$ thereon, mechanism for operating said plate and finger for the purpose set forth, the twisting devices C', Y', and J', and mechanism connecting the said driving shaft for operating the same, said parts being combined substantially as described.

9. The head $C^3$ with the mutilated pinion $D^3$ thereon, the pinion $E^3$, the arm $G^3$ secured to the shaft of said pinion $E^3$, the cross head J, the pitman connecting said arm and pinion, and the hook rod $K^3$, $L^3$ attached to said cross head, said parts being combined with the feed pulley N and wire-twisting device, substantially as described.

10. In a wire heddle machine, a frame with a driving shaft thereon, a spur wheel on said shaft, rollers mounted on said wheel, a pinion journaled in said frame and meshing with the said wheel, and a twisting device connected with said pinion, and having slides and clamping jaws operated by contact with said rollers, said parts being combined substantially as described.

11. In a wire heddle machine, a frame, a driving shaft mounted thereon, the gear wheel V secured on said shaft, having rollers thereon, a pinion journaled in said frame, a twisting device connected with said pinion and having clamping jaws operated by mechanism in contact with said rollers, a gear wheel loosely mounted on said driving shaft, mechanism connecting said gear wheels imparting reverse motion thereto, and a second pinion with connected twisting mechanism, said parts being combined substantially as described.

12. In a wire heddle machine, a twisting device having a rotary head, a circumferential flange thereon with openings therein, and a central plate, and a slide which is guided in said opening, and formed with cam faces, substantially as described.

13. In a wire heddle machine, a twisting device having a rotary head with slots therein, and clamping jaws which are provided with studs which enter said slots, means for operating said head.

14. In a wire heddle machine, the rotatable gear wheel A' having the roller $D^2$ on one of its faces, and the roller $E^2$ on its opposite face, the twisting device C' having the plates $Y^4$ and $Q^4$, said parts being combined substantially as described.

15. In a wire heddle machine, a twisting device having the head $S^3$, and tumbler $H^4$ mounted thereon, in combination with the slide $W^3$, which is fitted to said head and formed with depressions at opposite places to receive the ends of said tumbler, substantially as described.

16. In a wire heddle machine, a twisting device having a rotary head with slots therein, clamping jaws with studs in said slots, and an operating cam-faced slide for said head, in combination with screws on the head with which the backs of said screws tighten, substantially as described.

17. In a wire heddle machine, the twisting device C', having the plate $Q^4$, the block $R^4$ on said plate, the finger $S^4$ on said block, the pinion B' in which said plate is movable, and the cross bar N', on which the hub of said pinion is mounted, said hub having an opening $U^4$ through which said block $R^4$ is adapted to pass, and reach the wire, substantially as described.

18. In a wire heddle machine, the twisting device C' having the pinion B', and the spring-bolt $V^4$ therein, in combination with the open plate $Q^4$ having recesses with which said bolt engages, and the open plate $Z^4$, substantially as described.

19. In a wire heddle machine, the twisting device C' having the plate $Z^4$, having the sliding block $A^5$, with the finger $B^5$, the pinion B' in which said block is fitted, said pinion having the slot $C^5$ for said finger $B^5$, opposite to the finger $S^4$, and the spring bolt $E^5$ on the pinion B', said plate $Z^4$ having the recesses $F^5$ for engagement of the bolt $E^5$, substantially as described.

20. In a wire heddle machine, the rotatable wheel A', the rollers D' and $D^2$ on one face, and E' and $E^2$ on the opposite face, the pivoted lever F', a pinion meshing with said gear wheel and having a connected twisting device with parts operated by contact with said rollers and lever, said parts being combined substantially as described.

21. In a wire heddle machine, a frame, a driving shaft, a wire feed pulley having intermittent rotary motion, a rod with hook adapted to draw the wire from said pulley, twisting devices through which said rod passes, and mechanisms connected with the said shaft for imparting motions in opposite directions to said twisting devices, said parts being combined substantially as described.

22. In a wire heddle machine, a frame, a driving shaft, a wire feed pulley loosely mounted on said shaft and having intermittent rotary motion, a rod with means for drawing the wire from said pulley, twisting devices, mechanisms connected with the shaft for operating said devices, mechanism connected with said shaft for reciprocating said rod, said rod passing through said twisting devices, a clamping device for said wire, and a shearing device, said parts being combined substantially as described.

JEAN BÉNAZET.

Witnesses:
  JOHN A. WIEDERSHEIM,
  A. P. JENNINGS.